(12) United States Patent
Decker et al.

(10) Patent No.: US 11,821,624 B2
(45) Date of Patent: Nov. 21, 2023

(54) MULTI-FUEL ISOLATED IMPULSE INITIATOR

(71) Applicant: Bright Sand, Inc., Chattanooga, TN (US)

(72) Inventors: Earl R. Decker, Windsor (CA); Gregory F. Decker, Windsor (CA)

(73) Assignee: Bright Sand, Inc., Chattanooga, TN (US)

( * ) Notice: Subject to any disclaimer, the term of this patent is extended or adjusted under 35 U.S.C. 154(b) by 0 days.

(21) Appl. No.: 17/450,016

(22) Filed: Oct. 5, 2021

(65) Prior Publication Data
US 2022/0107086 A1    Apr. 7, 2022

Related U.S. Application Data

(60) Provisional application No. 63/087,843, filed on Oct. 5, 2020.

(51) Int. Cl.
| | | |
|---|---|---|
| *F23C 7/00* | (2006.01) | |
| *F23Q 3/00* | (2006.01) | |
| *F23C 1/00* | (2006.01) | |
| *F23C 15/00* | (2006.01) | |
| *F23L 3/00* | (2006.01) | |

(52) U.S. Cl.
CPC ............ *F23C 7/008* (2013.01); *F23C 1/00* (2013.01); *F23Q 3/008* (2013.01); *F23C 15/00* (2013.01); *F23C 2900/07001* (2013.01); *F23L 3/00* (2013.01)

(58) Field of Classification Search
CPC .. F23C 7/008; F23C 1/00; F23Q 3/008; F23D 14/38; F23D 2207/00
USPC ............ 431/91, 345–355, 254, 344; 126/231
See application file for complete search history.

(56) References Cited

U.S. PATENT DOCUMENTS

| | | | | |
|---|---|---|---|---|
| 2,164,417 | A * | 7/1939 | McKee | F23D 14/08 |
| | | | | 236/48 R |
| 2,592,267 | A * | 4/1952 | Gangemi | E01H 5/102 |
| | | | | 126/343.5 R |
| 3,229,748 | A * | 1/1966 | Spielman | F23C 7/008 |
| | | | | 431/352 |
| 4,509,434 | A | 4/1985 | Boday et al. | |
| (Continued) | | | | |

FOREIGN PATENT DOCUMENTS

| | | |
|---|---|---|
| CN | 202092129 U | 12/2011 |
| DE | 4301779 A1 | 7/1994 |
| JP | 2002295812 A | 10/2002 |

OTHER PUBLICATIONS

Partial International Search dated Jan. 26, 2022 in corresponding PCT/US2021/053654 (2 pages).

(Continued)

*Primary Examiner* — Vivek K Shirsat
(74) *Attorney, Agent, or Firm* — Capitol City TechLaw, PLLC; Samuel P. Burkholder

(57) ABSTRACT

A multi-fueled impulse initiator that includes a fuel source equipped with a control valve, an air source equipped with a control valve, a removable air flow insert having opposing inlet and outlet faces, an air expansion chamber fluidly connected to both the air source and the inlet face of the removable air flow insert, and an igniter assembly having a sparking tip. The removable air flow insert includes channels traversing from the inlet face to the outlet face of the air flow insert.

16 Claims, 5 Drawing Sheets

(56) References Cited

U.S. PATENT DOCUMENTS

| | | | |
|---|---|---|---|
| 6,234,785 B1* | 5/2001 | Kim | F23C 7/004 |
| | | | 431/350 |
| 2007/0289216 A1 | 12/2007 | Tsangaris et al. | |
| 2018/0259199 A1* | 9/2018 | Batson | F23L 17/005 |

OTHER PUBLICATIONS

International Search dated May 6, 2022 in corresponding PCT/US2021/053654 (6 pages).

* cited by examiner

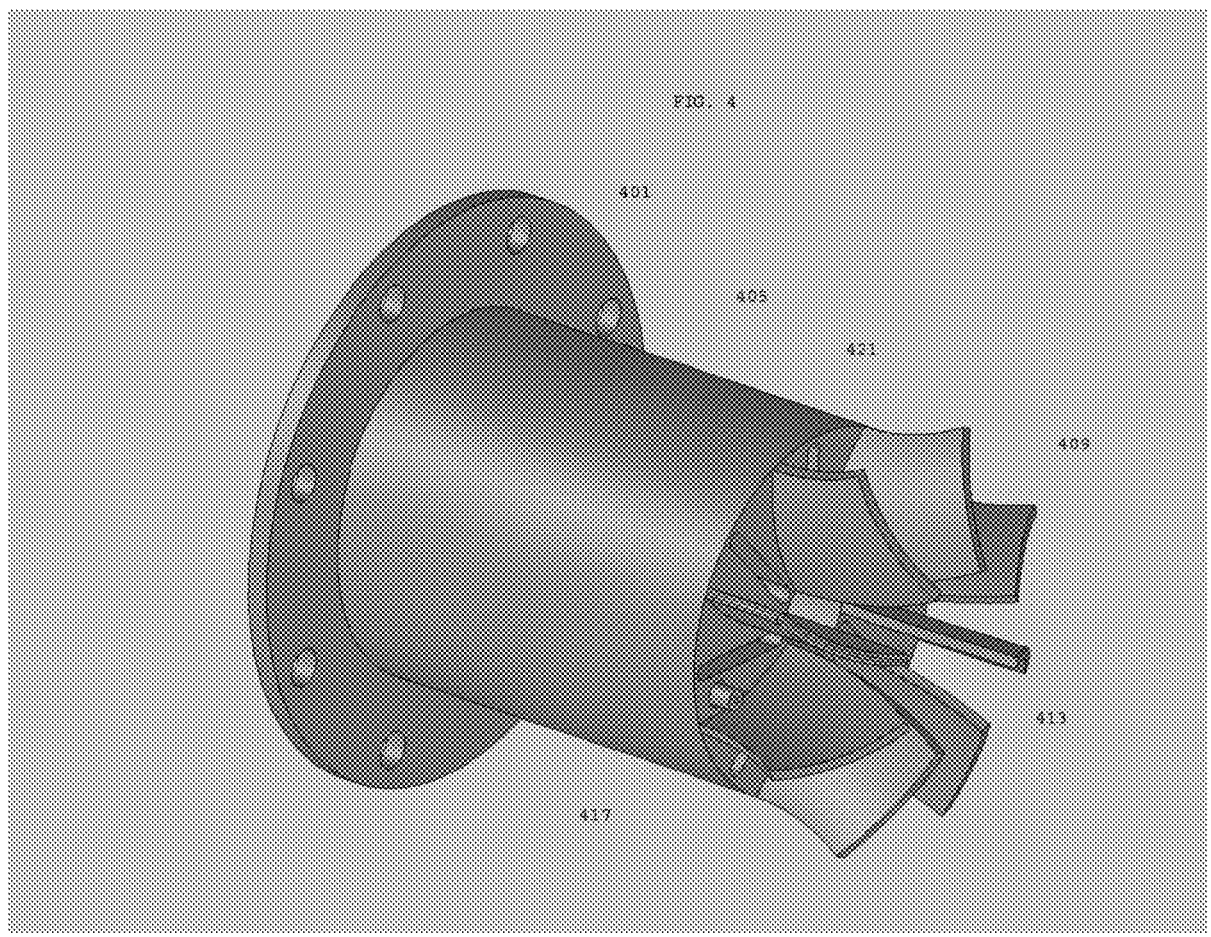

MULTI-FUEL ISOLATED IMPULSE INITIATOR

RELATED APPLICATIONS

The present application claims benefit from earlier filed U.S. Provisional Application No. 63/087,843, filed Oct. 5, 2020, which is incorporated by reference in its entirety for all purposes.

BACKGROUND

Field of Invention

The present disclosure relates to a process and equipment to improve the efficiency on various levels of chemical conversion, and energy consuming and generating devices and processes.

Discussion of the Related Art

There are numerous industrial processes that require reliable steady sources of high temperature air, including, for example, gasification processes, vapor conversion, pyrolysis, furnaces, kilns, and heaters. Manufacturing processes that involve glass, metal, and ceramic materials are just a few instances of processes that consume large amounts of resources to produce the high temperature conditions needed. Concurrently there is an abundance of municipal solid waste ("MSW"), commercial waste and industrial waste that needs to be processed in the most energy efficient manner while also breaking down any pollutants or biohazards present in the waste.

Equipment and processes to combine the decomposition of solid waste with the production of energy are of great interest to both producers and consumers of energy and waste materials.

SUMMARY OF THE DISCLOSURE

A multi-fuel isolated impulse initiator that includes a fuel source equipped with a control valve, an air source equipped with a control valve, a removable air flow insert having opposing inlet and outlet faces, an air expansion chamber fluidly connected to both the air source and the inlet face of the removable air flow insert, and an igniter assembly having a sparking tip is disclosed by the present teachings. The removable air flow insert includes channels traversing from the inlet face to the outlet face of the air flow insert.

The presently disclosed system and equipment can be used with a wide variety of feedstocks, including MSW, tires, agricultural waste, medical waste, and more. Of particular interest is medical waste which may contain pathogens that need to be destroyed or deactivated in the process. It is believed that the presently disclosed system and equipment would produce a combustion zone providing temperature and time to break down any and all pathogens. Typically, exposure to an environment of 1000° C. for sufficient time, typically at least 0.5 seconds will significantly denature prion proteins and destroy prion infectivity.

The presently disclosed initiator can be used on other types of systems besides autoclaves, for example, gasifiers, kilns, etc. In order to convert process gas as produced by various chemical conversion processes, typical combustors, vertical or horizontal can be ceramic and/or cement lined to combust process gas, and to retain the high heat energy levels in the process stream.

The present disclosure provides a multi-fuel isolated impulse initiator module which can be used to provide a more efficient conversion process. The disclosed initiator module allows for the air and fuel nozzle assembly to be changed to allow for efficient conversion of alternate fuel sources, such as, diesel, propane, natural gas, kerosene, biofuels, and other energy sources.

The multi-fuel isolated impulse initiator module can be used as an ignition module for starting a thermal cycle in an autoclave used, for example, to thermally decompose municipal solid waste.

BRIEF DESCRIPTION OF THE FIGURES

The accompanying drawings, which are included to provide a further understanding of the invention and are incorporated in and constitute a part of this specification, illustrates preferred embodiments of the invention and together with the detailed description serve to explain the principles of the invention. In the drawings:

FIG. 4 is a 3-D rendering of one embodiment of the removable air flow insert. None of the provided Figures are to scale.

DETAILED DESCRIPTION

Figure 1A:
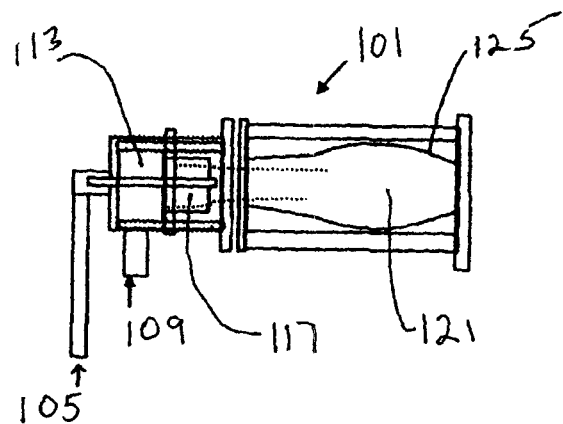
FIGS. 1A, 1B, 1C and 1D are graphic illustrations of some embodiments of an impulse initiator module.

The present disclosure is directed to a multi-fuel isolated impulse initiator that includes a fuel source equipped with a control valve, an air source equipped with a control valve, a removable air flow insert having opposing inlet and outlet faces, an air expansion chamber fluidly connected to both the air source and the inlet face of the removable air flow insert, and an igniter assembly having a sparking tip. The removable air flow insert includes channels traversing from the inlet face to the outlet face of the air flow insert.

The above air flow insert can include air direction components on its outlet face. Those the air direction components can be vents, vanes, and channels to alter the flow pattern of the air.

The disclosed initiator can further include a conversion chamber fluidly connected to the outlet face of the air flow insert. The fuel source for the initiator utilizes a closed fuel pathway which traverses the air flow insert to provide a fuel outlet on the outlet face of the air flow insert. The sparking tip can be positioned on the outlet face of the air flow insert and in the vicinity of the fuel outlet.

In some embodiments of the initiator, it can further include an air holding tank connected to the air expansion chamber. The fuel utilized by the numerous embodiments can be selected from the group consisting of diesel, propane, natural gas, and kerosene.

In other embodiments of the presently disclosed initiator, the air expansion chamber is an optional feature, and in such instances, the air source is directly fluidly connected to the inlet face of the air flow insert.

Some embodiments of the presently disclosed impulse initiator are represented in FIG. 1. In FIG. 1A, the impulse initiator 101 is coupled to a conversion chamber 121 which has a ceramic liner 125, and in some embodiments, as illustrated in FIGS. 1C and 1D, a fiber liner 129 sandwiched between the wall 137 and the ceramic liner 125. Fuel and air are added via inlets 105 and 109, respectively. Solenoid valves, not shown, can be installed at the inlets to control the addition of fuel and air, respectively, and to provide protection from back pressures from events in the process and the conversion chamber 121. In some embodiments, an air expansion chamber 113, is provided while in other embodiments, air is added directly via the air inlet 109 as illustrated in FIG. 1D.

Figure 1B:
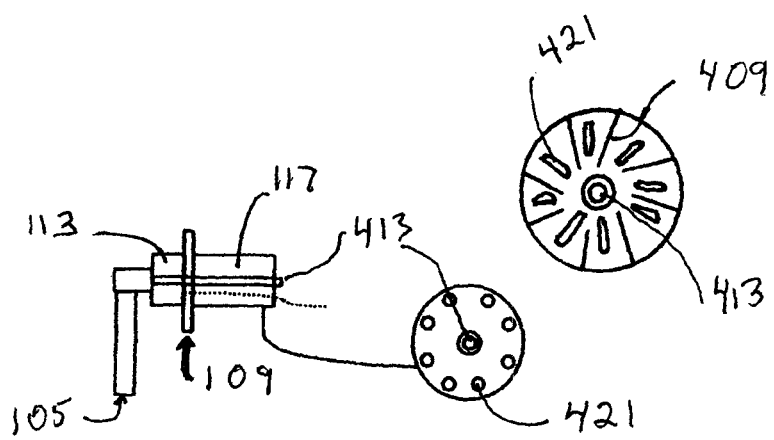
Figure 1C:
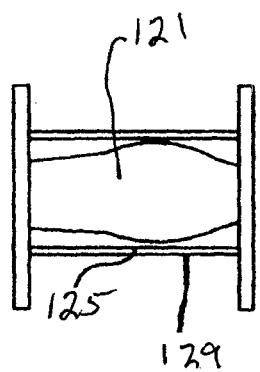

The removable air flow insert 117 can have slots or channels 421 penetrating from one face to the other face of the insert 117, as shown in FIG. 1B. The slots or channels can spiral, or go straight, as they traverse from one face to the other face of the air flow insert 117.

As shown in FIG. 1B, the fuel outlet 413 can be centrally located in the air flow insert 117. In some embodiments, vanes 409 can be located on the face of the air flow insert 117.

The configuration of the slots, channels, vanes and location of the fuel outlet can be optimized through the use of computational fluid dynamic ("CFD") analysis for various reaction parameters including air and fuel pressures, fuel type and targeted heat production.

Figure 2:
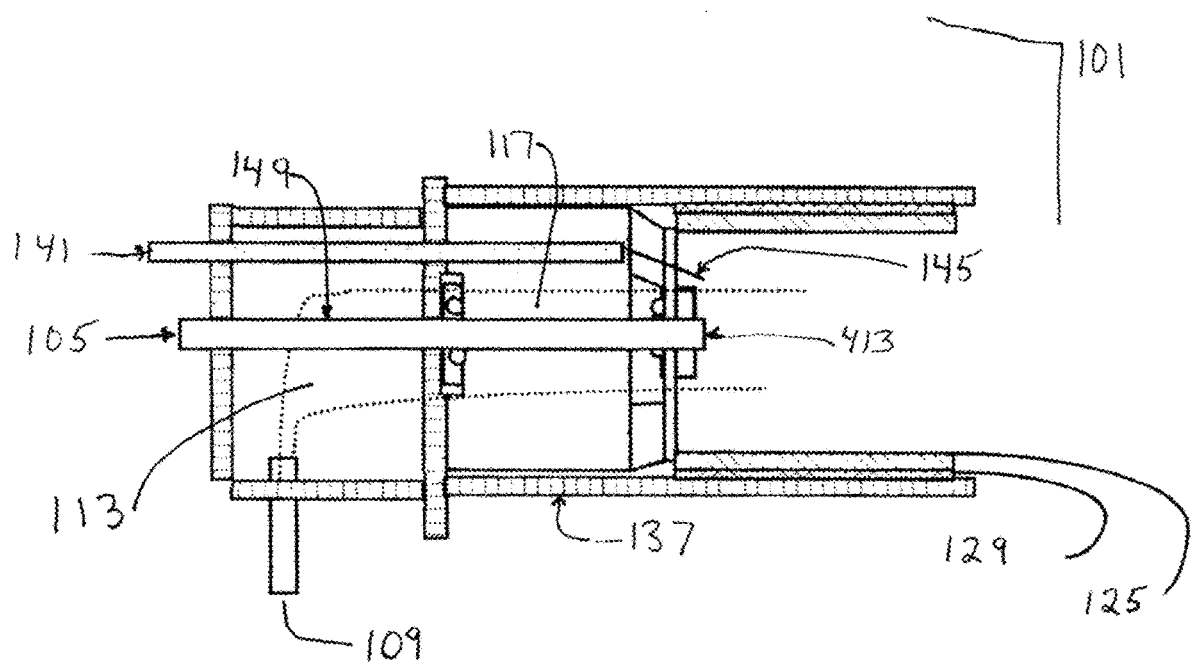
FIG. 2 is a general illustration of another embodiment of an impulse initiator module.

Another embodiment of the presently disclosed impulse initiator with an air expansion chamber 113 is presented in FIG. 2. The open end of the illustrated impulse initiator 101 is the conversion chamber 121 as more fully illustrated in FIG. 1A. The spark ignitor 141 is presented in FIG. 2, and traverses through the removable air flow insert 117 to its opposite face and provides a spark or ignition source for the air/fuel mixture formed from the fuel exiting opening 413, and the air exiting through the holes or slots 421 of the air flow insert 117. The fuel conduit 149 transports the fuel from inlet 105 to the fuel exiting opening 413. The tip of the spark ignitor 145 is positioned so that it can ignite the air/fuel mixture. The wall 137 of the conversion chamber can be manufactured from a suitable metal alloy and/or ceramic or other composite materials that is capable of withstanding the temperature and pressures, for instance, carbon steel or other alloys.

Figure 1D:
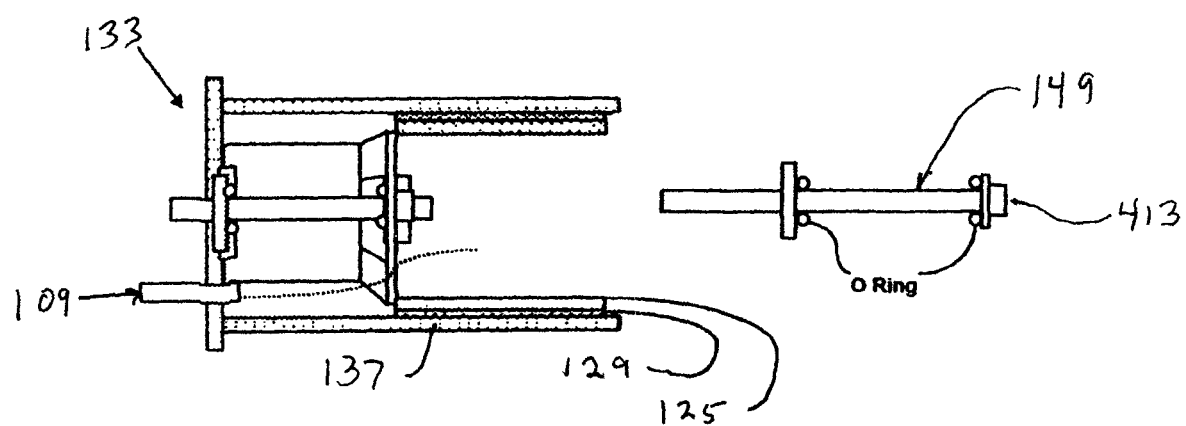
Figure 3:
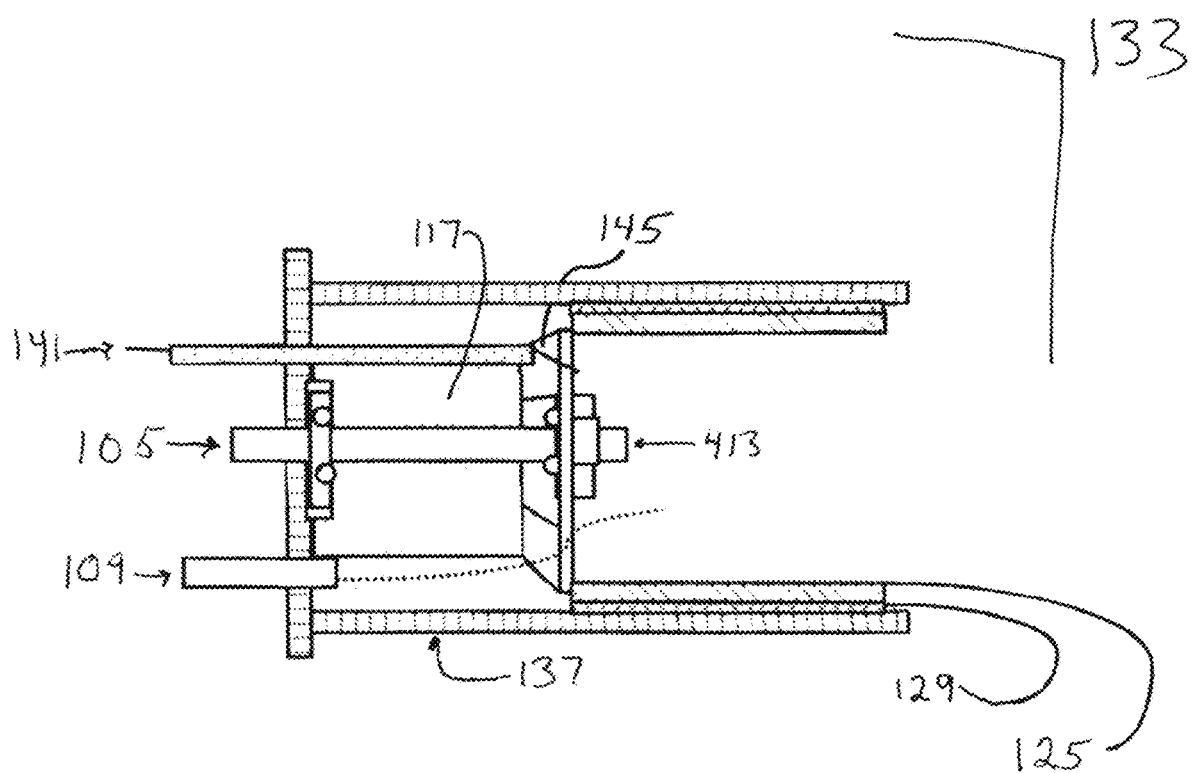
FIG. 3 is a general illustration of one embodiment of an impulse initiator module.

A more detailed drawing of the embodiment illustrated in FIG. 1D is presented in FIG. 3. This embodiment features direct addition of air by the air inlet 109 into the removable air flow insert 117. The spark igniter 141 is presented in FIG. 3, and traverses through the removable air flow insert 117 to its opposite face and provides a spark or ignition source for the air/fuel mixture formed from the fuel exiting opening 413, and the air exiting through the holes or slots 421 of the air flow insert 117. The spark tip of the ignitor 145 is located just off the face of the air flow insert 117 to ignite the air/fuel mixture. In some embodiments of the presently disclosed initiator, the tip of spark igniter 145 can be a hot glow plug or heat source capable of igniting the air/fuel mixture.

As illustrated in FIG. 4, the removable air flow insert 405 provides a flange 401 to connect to the air expansion chamber (not shown) with a fuel outlet 413 for the fuel supply to reach the conversion chamber (not shown). Air is provided by means of the slots 421 the flow of which is then altered by the vanes 409 and mixed with the fuel exiting the fuel outlet 413. The air/fuel mixture is ignited by the spark igniter 417 which in some embodiments can be a hot glow plug or heat source capable of igniting the air/fuel mixture. The hot glow plug or heat source is one alternative to a sparking igniter and the type of igniter can be selected as needed by the fuel. In some instances, there can be both types of ignition source present on the face of the air flow insert 405.

Among other features of the presently disclosed impulse initiator module are that the air supply can be flowed continuously and/or pulsed, and an air tank can be used to hold a volume of air at a pressure differing from supplied plant air. Typically, compressed plant air or blower air is provided at pressure levels ranging from about 15 to 175 psi. One purpose of the air tank is to provide the capability of adding a larger volume of air at a lower pressure and lower velocity. In other instances, air can be injected at higher pressures and velocity than supplied plant air. One embodiment of the initiator module is illustrated in FIG. 1.

Among other features of the initiator module, an air expansion chamber can be located prior to the removable air flow insert. In any case, the air can be flowed continuously and/or pulsed as the conditions dictate. The air source can be compressed air, or a Roots type blower/compressor. A modulating solenoid air control valve, such as the "Air Saver" valves manufactured by Parker Hannifin Corporation, can be utilized to reduce overall air consumption.

The duration and cycling of the air pulse will be determined by CFD modeling, will vary with the type of fuel being combusted, and the amount of heat energy needed to be generated.

As shown in FIG. 2, in some embodiments, there can be air injection into process line prior to the combustor to affect the air pattern and mixing of fuel and air. Factors to be considered in the combustion process include the volume of air to process gas, the ratio of process gas temp and flow, the timing of pulses, and the resulting interaction of the process flow into the chamber.

In some embodiments, the initiator will have varying impacts on:
  a. air pattern and mixing, and
  b. volume of air to fuel-ratio of process gas temperature and airflow.

These factors may all be influenced by the type of fuel being used and on the targeted level of heat energy required to be provided to the process. The BTU content of the fuel may also affect the other factors.

The impulse initiator can be used as a back up heat source to provide enough BTU value to a process, for instance, to generate heat and/or electricity by adding multiple fuel and air nozzles allowing for modulation of the process.

Solenoid valves provide shut offs for both the air and fuel inputs thus allowing the module to hold a back pressure from the operating process to which it is providing heated air. The presently disclosed initiator module can be designed specifically for each installation and respective process conditions. Thus, the specific design parameters, valve properties, and material requirements can be modified for each installation. Accordingly, the material properties, thickness, hardness, chemical resistance, and other parameters can be varied according to the requirements of the installation. For example, the solenoid valves control fuel and air input at inlets 105 and 109, respectively, can be specified as needed. This module isolation can lead to prevention of exposing the initiator to blow back and/or flashback from the process to which it is providing heated air. This isolating capability, while the module is not in use, can increase the life of the initiator module and associated valves.

In some embodiments, a ceramic (or other material with resistance to high temperature exposure with increased durability and structural integrity) insert has a pattern of vents equally spaced around the fuel nozzle. The vents form the air into a circular pattern to provide more complete thorough mixing of air and fuel. In some embodiments, the vents can be replaced by holes or channels formed in the ceramic insert. The channels can be curved as they traverse from one end to the other of the air flow insert so that the air is swirling as it exits and mixes with the fuel.

In some embodiments, the initiator module can be manufactured entirely or from pieces which are constructed using 3D printing technology using suitable alloys, ceramics, composites, and other material compositions. In some embodiments, a non-conductive removable air flow insert, for instance, ceramic, prevents the spark igniters from reacting with the surface of the insert.

An autoclave suitable for used along with the presently disclosed apparatus can include the vessels generally described in the applicant's prior patents, U.S. Pat. No. 8,715,582 B2, and U.S. Pat. No. 11,098,251 B2, the disclosures of which are incorporated by reference herein in their entirety for all purposes.

All publications, articles, papers, patents, patent publications, and other references cited herein are hereby incorporated by reference herein in their entireties for all purposes.

Although the foregoing description is directed to the preferred embodiments of the present teachings, it is noted that other variations and modifications will be apparent to those skilled in the art, and which may be made without departing from the spirit or scope of the present teachings. The provided figures are not to scale, and the angles between various members of the apparatus are merely illustrative.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A multi-fuel isolated impulse initiator comprising
a fuel source equipped with a control valve;
an air source equipped with a control valve;
a removable air flow insert through which all air flows, and having opposing inlet and outlet faces;
an air expansion chamber fluidly connected to both the air source and the inlet face of the removable air flow insert;
a conversion chamber fluidly connected to the outlet face of the air flow insert, and
an igniter assembly having a sparking tip;
wherein the removable air flow insert further comprises air direction components on its outlet face, and channels traversing from the inlet face to the outlet face of the air flow insert, and
both the fuel source and the air source are isolated from the conversion chamber.

2. The initiator according to claim 1, wherein the air direction components comprise vents, vanes, and channels to alter the flow pattern of the air.

3. The initiator according to claim 1,
wherein the fuel source further comprises a closed fuel pathway traversing the air flow insert to provide a fuel outlet on the outlet face of the air flow insert.

4. The initiator according to claim 3, wherein the sparking tip is positioned on the outlet face of the air flow insert and in the vicinity of the fuel outlet.

5. The initiator according to claim 1,
wherein the igniter assembly comprises a sparking tip located on the outlet face of the air flow insert.

6. The initiator according to claim 1
further comprising an air holding tank connected to the air expansion chamber.

7. The initiator according to claim 1,
wherein the fuel is selected from the group consisting of diesel, propane, natural gas, and kerosene.

8. A multi-fuel isolated impulse initiator comprising
a fuel source equipped with a control valve;
an air source equipped with a control valve;
a removable air flow insert through which all air flows having opposing inlet and outlet faces;
the air source fluidly connected to the inlet face of the removable air flow insert;
a conversion chamber fluidly connected to the outlet face of the air flow insert, and
an igniter assembly;
wherein the removable air flow insert further comprises air direction components on its outlet face, and channels traversing from the inlet face to the outlet face of the air flow insert, and
both the fuel source and the air source are isolated from the conversion chamber.

9. The initiator according to claim 8 further comprising an air expansion chamber fluidly connected to both the air source and the inlet face of the removable air flow insert.

10. The initiator according to claim 8,
wherein the air direction components comprise vents, vanes, and channels to alter the flow pattern of the air.

11. The initiator according to claim 8,
wherein the fuel source further comprises a closed fuel pathway traversing the air flow insert to provide a fuel outlet on the outlet face of the air flow insert.

12. The initiator according to claim 11, wherein the sparking tip is positioned on the outlet face of the air flow insert and in the vicinity of the fuel outlet.

13. The initiator according to claim 8,
wherein the igniter assembly comprises a sparking tip located on the outlet face of the air flow insert.

14. The initiator according to claim 9,
further comprising an air holding tank connected to the air expansion chamber.

15. The initiator according to claim 8,
wherein the fuel is selected from the group consisting of diesel, propane, natural gas, and kerosene.

16. A multi-fuel isolated impulse initiator comprising
a fuel source equipped with a control valve;
an air source equipped with a control valve;
a removable air flow insert through which all air flows, and having opposing inlet and outlet faces;
an air only expansion chamber fluidly connected to both the air source and the inlet face of the removable air flow insert;
a conversion chamber fluidly connected to the outlet face of the air flow insert, and
an igniter assembly having a sparking tip;
wherein the removable air flow insert further comprises channels traversing from the inlet face to the outlet face of the air flow insert, and both the fuel source and the air source are isolated from the conversion chamber.

\* \* \* \* \*